United States Patent
Lo et al.

(10) Patent No.: US 7,312,409 B2
(45) Date of Patent: Dec. 25, 2007

(54) TOUCH PAD AND POSITION DETECTING CIRCUIT AND METHOD THEREOF

(75) Inventors: Lih-Sheng Lo, Hsinchu County (TW); Hung-Ta Hsu, Hsinchu (TW); Tung-Tsai Liao, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 606 days.

(21) Appl. No.: 10/709,262

(22) Filed: Apr. 26, 2004

(65) Prior Publication Data

US 2005/0179669 A1    Aug. 18, 2005

(30) Foreign Application Priority Data

Feb. 16, 2004    (TW) .............................. 93103590 A

(51) Int. Cl.
*G06F 3/041* (2006.01)
*G06K 11/06* (2006.01)
*G08C 21/00* (2006.01)

(52) U.S. Cl. .............................. 178/18.01; 178/18.05; 345/174

(58) Field of Classification Search .. 178/18.01–20.01; 345/173–179, 157
See application file for complete search history.

(56) References Cited

U.S. PATENT DOCUMENTS 3,875,331 A * 4/1975 Hasenbalg ............... 178/18.01
4,055,726 A * 10/1977 Turner et al. ............ 178/18.05
5,113,041 A * 5/1992 Blonder et al. ............. 345/173

\* cited by examiner

*Primary Examiner*—Amr A. Awad
*Assistant Examiner*—Yong Sim
(74) *Attorney, Agent, or Firm*—Jianq Chyun IP Office

(57) ABSTRACT

A touch pad and a position detecting circuit and method thereof are provided. The touch pad uses a waveform generator to generate an input signal; the input signal is capable of gradually moving a position of a zero voltage on the sensing pad in a predetermined direction. The touch pad also uses the zero voltage detector to detect when a zero voltage of the sensing signal of the sensing pen occurs so as to determine the position of the sensing pen on the sensing pad. Hence, the analog-to-digital converter is not required. Therefore, the resolution can be easily expanded, and the cost, the preciseness, and the specification can be easily controlled.

10 Claims, 5 Drawing Sheets

TOUCH PAD AND POSITION DETECTING CIRCUIT AND METHOD THEREOF

CROSS REFERENCE TO RELATED APPLICATIONS

This application claims the priority benefit of Taiwan application serial no. 93103590, filed Feb. 16, 2004.

BACKGROUND OF INVENTION

1. Field of the Invention

This invention generally relates to an input peripheral device, and more particularly to a touch pad and a position detecting circuit and method thereof.

2. Description of Related Art

As the technology advances, the computer hardware and software are being well developed. Among those hardware and software developments, the development of the children educational hardware and software is one of the most important fields. To facilitate the childrens operating the children educational hardware and software, the touch pad generally is used as the input peripheral device.

FIG. 1 is the simplified diagram of a touch pad. Referring to FIG. 1, the touch pad includes a sensing pad 110, a sensing pen 120 and a position detecting circuit (not shown). The sensing pad 110 has points A and B in the vertical direction and points C and D in the horizontal direction for receiving the input signals. Because the sensing pad 110 is uniformly resistance-distributed, the electrical field generated by the input signals will be uniformly distributed. Hence, the position detecting circuit can detect the position of the sensing pen 120 based on the sensing signal detected by the sensing pen 120.

FIG. 2 is the waveform of the touch pad oF FIG. 1 during the input operation. Referring to FIG. 2, during the stage S1, the same voltage will be applied to points A, B, C, and D. Hence, the sensing signal detected by the sensing pen 120 is shown as the waveform E during the stage S1. The magnitude of waveform E will be used for determining the position of the sensing pen 120 during the stages S2 and S3. As shown in FIG. 2, during the stage S2, the same voltage as in the stage S1 will be applied to point A only; during the stage S3, the same voltage as in the stage S1 will be applied to point C only. Because the sensing pad 110 is uniformly resistance-distributed, the waveform E detected by the sensing pen 120 during the stages S2 and S3 is shown in FIG. 2. The position detecting circuit will depend on the ratio of the magnitude of the waveform E during the stages S2 and S3 to the magnitude of the waveform E during the stage S1 to determine the position of the sensing pen 120.

However, the prior art has the following drawbacks: 1. Because it uses the magnitude of the sensing signal detected by the sensing pen to determine the position of the sensing pen, it requires a higher resolution, which means that it requires more precise analog-to-digital converters and therefore it is hard to reduce the cost. 2. It is hard to control the preciseness and the specification for mass production by detecting the magnitude or energy of the induced voltage.

SUMMARY OF INVENTION

Accordingly, the present invention is directed to a touch pad and a position detecting circuit and method thereof without analog-to-digital converter (ADC). Therefore, the resolution can be easily expanded and the cost, the preciseness and the specification can be easily controlled.

According to an embodiment of the present invention, a touch pad and a position detecting circuit thereof are provided. The touch pad includes a sensing pad, a sensing pen and a position detecting circuit. The position detecting circuit includes a waveform generator, a filter, an amplifier, an envelope detector, a zero voltage detector and a controller.

The waveform generator generates an input signal; the input signal moves a position of a zero voltage on the sensing pad in a predetermined direction gradually. The filter receives a sensing signal sensing by the sensing pen, and filters and outputs the sensing signal. The amplifier, coupled to the filter, receives and amplifies the filtered sensing signal. The envelope detector, coupled to the amplifier, detects the filtered-amplified sensing signal and generates an envelope signal. The zero voltage detector, coupled to the envelope detector, receives the envelope signal and generates an output signal; the output signal is capable of determining when a zero voltage occurs. The controller, coupled to the waveform generator and the zero voltage detector, controls the waveform generator to generate the input signal and determines a position of the sensing pen on the sensing pad responsive to the output signal from the zero voltage detector.

In an embodiment of the present invention, the position detecting circuit further comprises a multiplexer for switch-inputting the input signal between a horizontal direction and a vertical direction of the sensing pad.

In an embodiment of the present invention, the waveform generator includes two digital-to-analog converters generating the input signal moving the position of the zero voltage on the sensing pad in the predetermined direction gradually.

In an embodiment of the present invention, the position of the zero voltage moves back and forth in the predetermined direction in order to compensate the possible error made by the zero voltage detector when determining the position of the sensing pen.

In an embodiment of the present invention, the zero voltage detector is a comparator.

The present invention is also directed to a position detecting method for a touch pad including a sensing pad and a sensing pen. In the present embodiment, a input signal is input, wherein the input signal is capable of gradually moving a position of a zero voltage on the sensing pad in a predetermined direction; and a position of the sensing pen on the sensing pad is determined based on a timing when a zero voltage of a sensing signal of the sensing pen occurs.

In an embodiment of the present invention, the input signal is input via a switch between a horizontal direction and a vertical direction of the sensing pad.

In an embodiment of the present invention, the position of the zero voltage moves back and forth in the predetermined direction.

In light of the above, the touch pad and the position detecting circuit and method thereof, according to an embodiment of the present invention, do not require the analog-to-digital converter. The resolution can be easily expanded by changing the gradient of moving the position of the zero voltage on the sensing pad by the input signal generated by the waveform generator. Hence, the cost, the preciseness, and the specification can be easily controlled.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
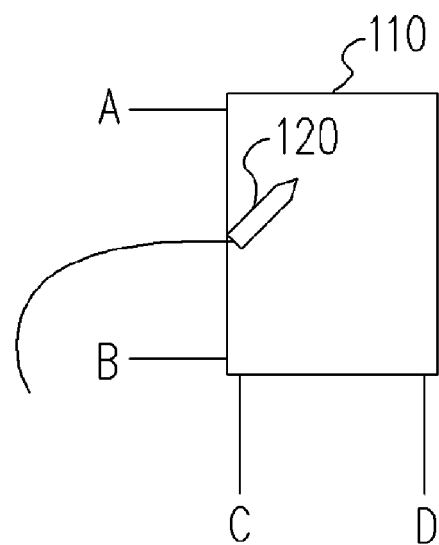
FIG. 1 is a simplified diagram of a touch pad.
Figure 2:
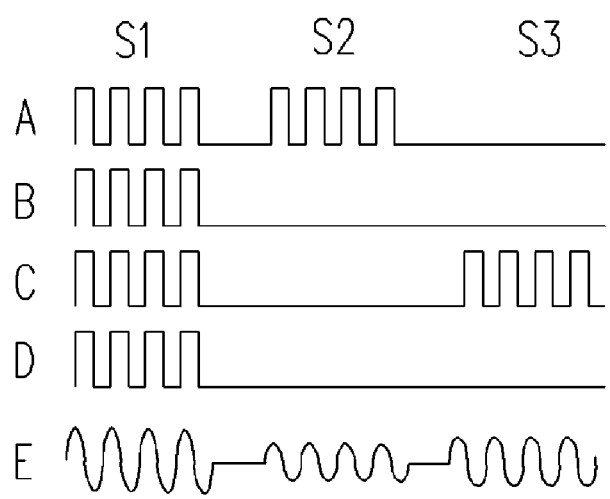
FIG. 2 is a waveform of the touch pad of FIG. 1 during the input operation.
Figure 3:
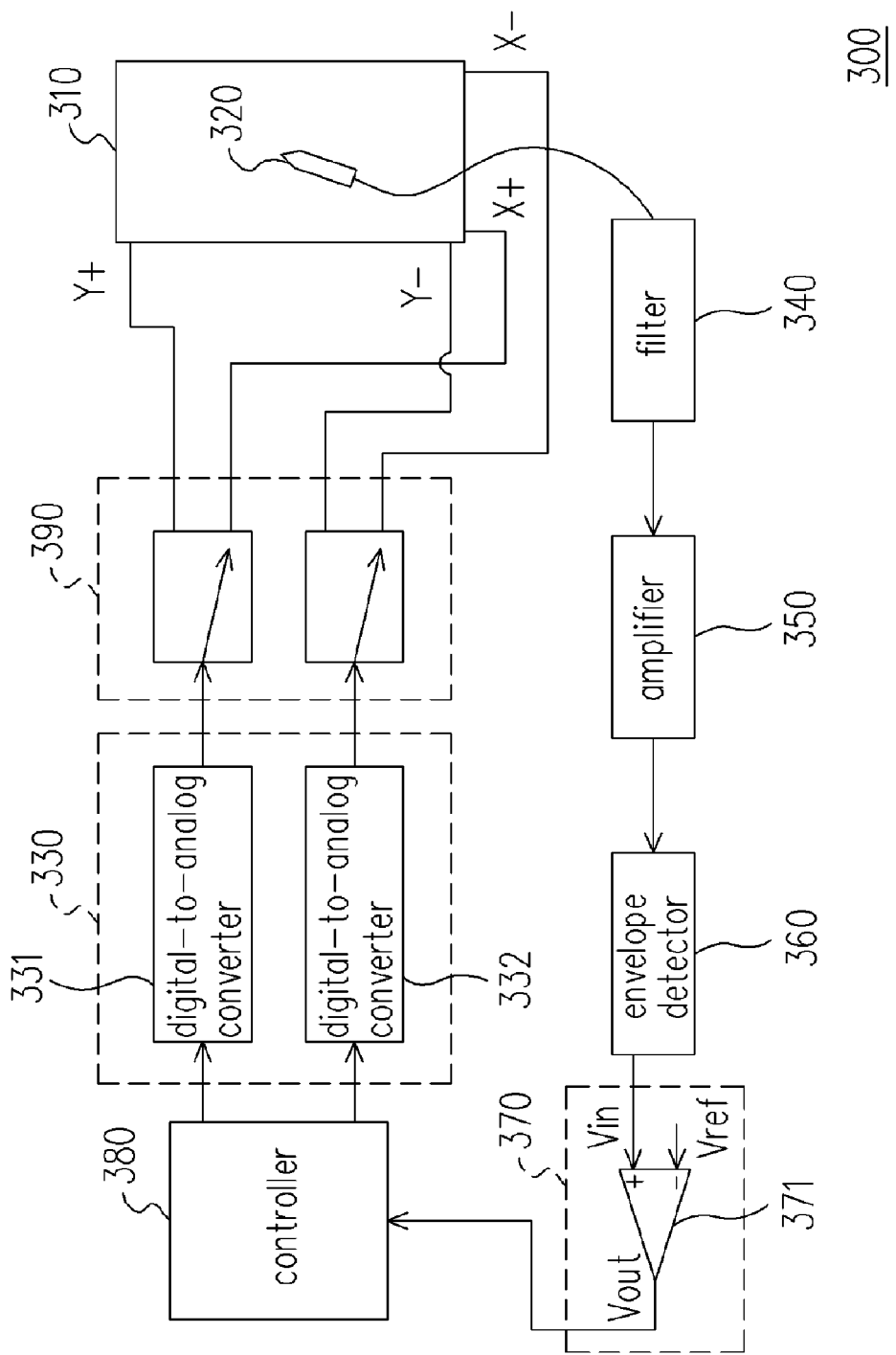
FIG. 3 shows a block diagram of the touch pad and a position detecting circuit thereof in accordance with an embodiment of the present invention.

FIG. 3 shows a block diagram of the touch pad and a position detecting circuit thereof in accordance with an embodiment of the present invention. Referring to FIG. 3, the touch pad 300 includes a sensing pad 310, a sensing pen 320 and a position detecting circuit. The position detecting circuit includes a waveform generator 330 including two digital-to-analog converters 331 and 332, a filter 340, an amplifier 350, an envelope detector 360, a zero voltage detector 370 (e.g., a comparator 371), and a controller 380.

In addition, because the touch pad 300 is a two-dimensional touch pad, the sensing pen 320 can move in the vertical and horizontal directions of the sensing pad 310. Hence, the position detecting circuit can further includes a multiplexer 390 for switch-inputting the input signal generated by the waveform generator 330 between the horizontal direction and the vertical direction of the sensing pad 310 in order to alternately detect the position of the sensing pen 320 on the sensing pad 310 in the horizontal direction and the vertical direction. Because the detection of the position of the sensing pen 320 on the sensing pad 310 in the horizontal direction and the vertical direction is similar, the following description will only illustrate the operation when the multiplexer 390 is switched to the horizontal direction of the sensing pad 310, i.e., the operation when the input signal is sent to points X+ and X− of the sensing pad 310.

Figure 4:
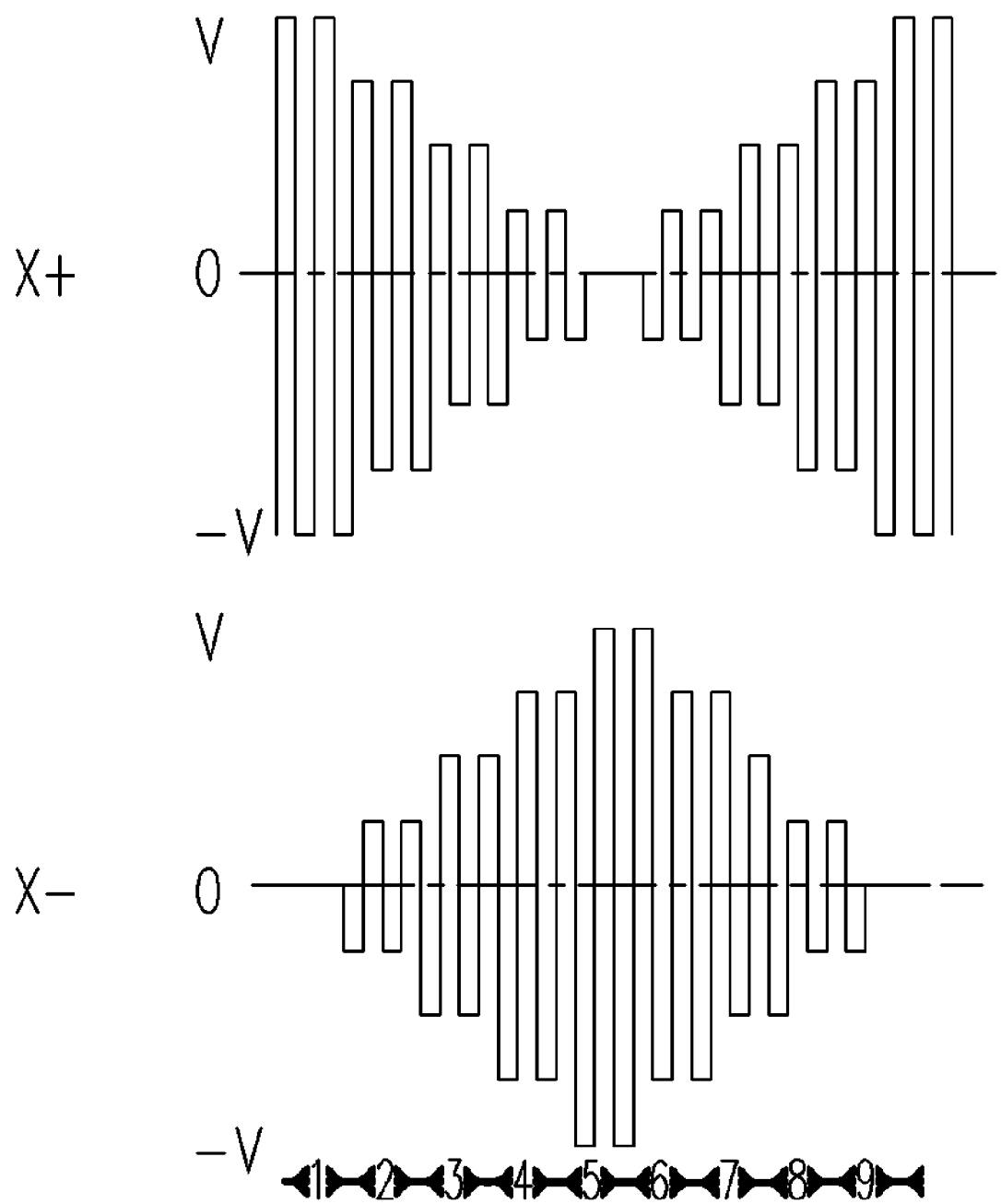
FIG. 4 shows a waveform of the input signal generated by a waveform generator in accordance with an embodiment of the present invention.

FIG. 4 shows the waveform of the input signal generated by the waveform generator in accordance with an embodiment of the present invention. In FIG. 4, the whole detecting process is divided into nine time slots. In each time slot points X+ and X− will send out two square waves. The square wave has different magnitudes, including V, 3V/4, 2V/4, V/4, 0,−V/4, −2V/4, −3V/4, and −V. In the positive half waveform of time slot 1, the magnitude of the voltage of point X+ is V; the magnitude of the voltage of point X− is 0. Hence, the electrical field distribution of the sensing pad 310 is shown as FIG. 5(a); the position of zero voltage is on the axis A of FIG. 6. In the negative half waveform of time slot 1, the magnitude of the voltage of point X+ is −V; the magnitude of the voltage of point X− is 0. Hence, the electrical field distribution of the sensing pad 310 is shown as FIG. 5(b); the position of zero voltage is on the axis A of FIG. 6. Therefore, in time slot 1, the position of zero voltage is on the axis A of FIG. 6.

In the positive half waveform of time slot 2, the magnitude of the voltage of point X+ is 3V/4; the magnitude of tbe voltage of point X− is −V/4. Hence, the electrical field distribution of the sensing pad 310 is shown in FIG. 5(c); the position of zero voltage is on the axis B of FIG. 6. In the negative half waveform of time slot 2, the magnitude of the voltage of point X+ is −3V/4; the magnitude of the voltage of point X− is −V/4. Hence, the electrical field distribution of the sensing pad 310 is shown as FIG. 5(d); the position of zero voltage is on the axis B of FIG. 6. Therefore, in time slot 2, the position of zero voltage is on the axis B of FIG. 6.

Figure 5:
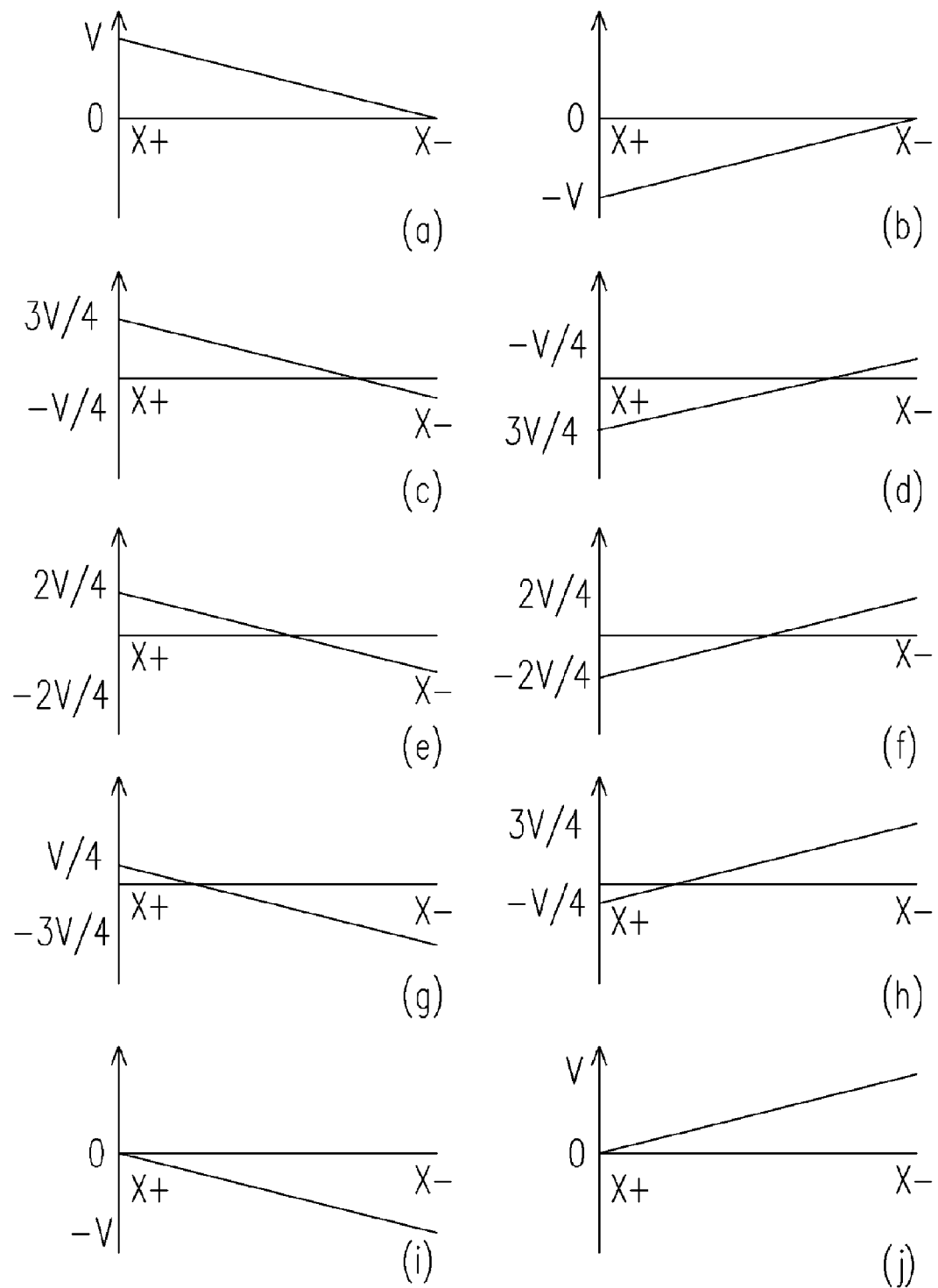
FIG. 5 shows an electrical field distribution of the sensing pad
Figure 6:
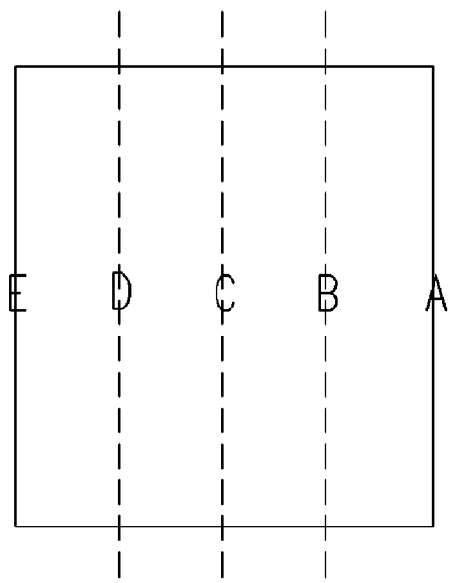
FIG. 6 shows axes of the sensing pad.

Likewise, in time slot 3, the electrical field distribution of the sensing pad 310 is shown in FIGS. 5(e) and (f); the position of zero voltage is on the axis C of FIG. 6. In time slot 4, the electrical field distribution of the sensing pad 310 is shown in FIGS. 5(g) and (h); the position of zero voltage is on the axis D of FIG. 6. In time slot 5, the electrical field distribution of the sensing pad 310 is shown in FIGS. 5 (i) and (j); the position of zero voltage is on the axis E of FIG. 6. In time slot 6, the electrical field distribution of the sensing pad 310 is shown in FIGS. 5(g) and (h); the position of zero voltage is on the axis D of FIG. 6. In time slot 7, the electrical field distribution of the sensing pad 310 is shown in FIGS. 5(e) and (f); the position of zero voltage is on the axis C of FIG. 6. In time slot 8, the electrical field distribution of the sensing pad 310 is shown in FIGS. 5(c) and (d); the position of zero voltage is on the axis B of FIG. 6. In time slot 9, the electrical field distribution of the sensing pad 310 is shown in FIGS. 5(a) and (b); the position of zero voltage is on the axis A of FIG. 6.

Therefore, when detecting the timing when the zero voltage occurs, it can determine that the position of the sensing pen is at one of the axes A, B, C, D, and E. In this embodiment, the position of the sensing pen 320 is detected twice at one of the axes A, B, C, D, and E in the whole scanning period. The purpose of doing so is to average the result in order to compensate the possible error generated by the zero voltage detector 370. Of course it also can be done by scanning several times and doing statistics to enhance the preciseness.

Figure 7:
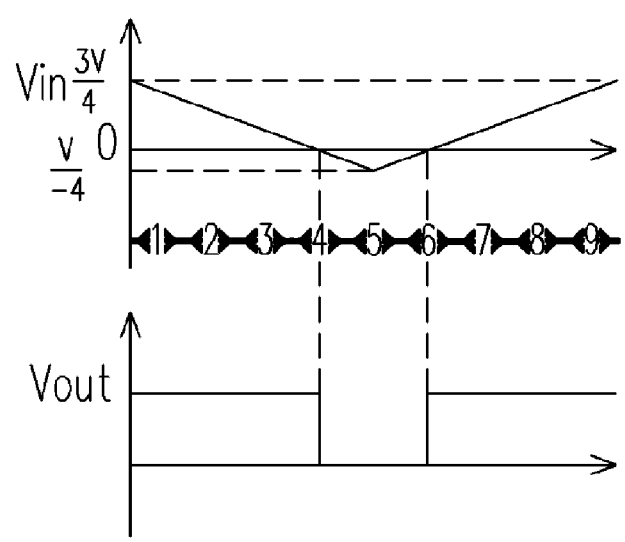
FIG. 7 shows a input and an output waveforms of the zero voltage detector in accordance with an embodiment of the present invention.

Referring to FIG. 3, the filter 340 receives a sensing signal sensed by the sensing pen 320, and filters and outputs the sensing signal. The amplifier 350 receives and amplifies the filtered sensing signal. The envelope detector 360 detects the filtered-amplified sensing signal and generates an envelope signal Vin as shown in FIG. 7. The envelope signal Vin as shown in FIG. 7 is assumed to be generated when the position of the sensing pen 320 is at the axis D of FIG. 6. At this time, the position of the zero voltage occurs at time slots 4 and 6.

As shown in FIG. 3, the envelope signal Vin enters into the positive input terminal of the comparator 371. The negative input terminal of the comparator 371 will receive the zero voltage reference signal Vref. Hence, the output terminal of the comparator 371 will output the output signal Vout, which can determine the timing when the zero voltage occurs. The controller 380 can determine the position of the sensing pen 320 on the sensing pad based on the output signal Vout of the comparator 371. In this example, when the controller 380 finds that the falling edge and the rising edge of the output signal Vout occur at time slots 4 and 6 respectively, it can determine that the sensing pen 320 is at the axis D of the sensing pad.

It should be noted that although the above embodiment divides the whole scanning process into nine time slots and in each time slot points X+ and X− will send out two square waves, the number of the square waves sent at points X+ and X− can be changed based on the need. In addition, the number of the time slots depends on the required resolution. For example, if the required resolution is 256, the number of the time slots of the above embodiment is 256×2−1=511 time slots. Hence only a 8bit digital-to-analog converter or a voltage divider circuit with eight resistors are required. Therefore, the resolution can be easily expanded in accordance with an embodiment of the present invention, and the cost, the preciseness, and the specification can be easily controlled.

Based on the above description, a position detecting method is also provided. This position detecting method is suitable for a touch pad including a sensing pad and a sensing pen. The position detecting method comprises: inputting an input signal, wherein the input signal is capable of gradually moving a position of a zero voltage on the sensing pad in a predetermined direction; and determining a position of the sensing pen based on a timing when a zero voltage of a sensing signal of the sensing pen occurs.

In an embodiment of the present invention, the input signal is input via switch between a horizontal direction and a vertical direction of the sensing pad.

In an embodiment of the present invention, the position of the zero voltage moves back and forth in the predetermined direction.

The above description provides a full and complete description of the preferred embodiments of the present invention. Various modifications, alternate construction, and equivalents may be made by those skilled in the art without changing the scope or spirit of the invention. Accordingly, the above description and illustrations should not be construed as limiting the scope of the invention, which is defined by the following claims.

The invention claimed is:

1. A position detecting circuit for a touch pad, said touch pad including a sensing pad and a sensing pen, the position detecting circuit comprising:
   a waveform generator, for generating an input signal, wherein said input signal is capable of gradually moving a position of a zero voltage on said sensing pad in a predetermined direction;
   a filter, for receiving a sensing signal sensed by said sensing pen, and filtering and outputting said sensing signal;
   an amplifier, coupled to said filter, for receiving and amplifying said filtered sensing signal;
   an envelope detector, coupled to said amplifier, for detecting said filtered-amplified sensing signal and generating an envelope signal;
   a zero voltage detector, coupled to said envelope detector, for receiving said envelope signal and generating an output signal, wherein said output signal is capable of determining as to when a zero voltage occurs; and
   a controller, coupled to said waveform generator and said zero voltage detector, for controlling said waveform generator to generate said input signal and determining a position of said sensing pen on said sensing pad responsive to said output signal from said zero voltage detector,
   wherein said position of said zero voltage moves back and forth in said predetermined direction.

2. The circuit of claim 1, further comprising a multiplexer for switch-inputting said input signal between a horizontal direction and a vertical direction of sensing pad.

3. The circuit of claim 1, wherein said waveform generator includes two digital-to-analog converters.

4. The circuit of claim 1, wherein said zero voltage detector is a comparator.

5. A position detecting method for a touch pad, said touch pad including a sensing pad and a sensing pen, the method comprising:
   inputting an input signal, wherein said input signal is capable of gradually moving a position of a zero voltage on said sensing pad in a predetermined direction; and
   determining a position of said sensing pen on said sensing pad based on a timing when a zero voltage of a sensing signal of said sensing pen occurs,
   wherein said position of said zero voltage moves back and forth in said predetermined direction.

6. The method of claim 5, further comprising switch-inputting said input signal between a horizontal direction and a vertical direction of said sensing pad.

7. A touch pad, comprising:
   a sensing pad;
   a sensing pen;
   a waveform generator, for generating an input signal, wherein said input signal is capable of moving a position of a zero voltage on said sensing pad in a predetermined direction gradually;
   a filter, for receiving a sensing signal sensed by said sensing pen, filtering and outputting said sensing signal;
   an amplifier, coupled to said filter, for receiving and amplifying said filtered sensing signal;
   an envelope detector, coupled to said amplifier, for detecting said filtered-amplified sensing signal and generating an envelope signal;
   a zero voltage detector, coupled to said envelope detector, for receiving said envelope signal and generating an output signal, wherein said output signal is capable of determining as to when a zero voltage occurs; and
   a controller, coupled to said waveform generator and said zero voltage detector, for controlling said waveform generator to generate said input signal and determining a position of said sensing pen on said sensing pad responsive to said output signal from said zero voltage detector,
   wherein said position of said zero voltage moves back and forth in said predetermined direction.

8. The touch pad of claim 7, further comprising a multiplexer for switch-inputting said input signal between a horizontal direction and a vertical direction of said sensing pad.

9. The touch pad of claim 7, wherein said waveform generator includes two digital-to-analog converters.

10. The touch pad of claim 7, wherein said zero voltage detector is a comparator.

* * * * *